United States Patent
Broomer et al.

(10) Patent No.: US 10,451,204 B2
(45) Date of Patent: Oct. 22, 2019

(54) LOW LEAKAGE DUCT SEGMENT USING EXPANSION JOINT ASSEMBLY

(71) Applicant: United Technologies Corporation, Hartford, CT (US)

(72) Inventors: Mark Broomer, Boston, MA (US); Russell E. Keene, Arundel, ME (US); Timothy M. Davis, Kennebunk, ME (US); Mark J. Rogers, Kennebunk, ME (US)

(73) Assignee: United Technologies Corporation, Farmington, CT (US)

( * ) Notice: Subject to any disclaimer, the term of this patent is extended or adjusted under 35 U.S.C. 154(b) by 1006 days.

(21) Appl. No.: 14/765,849

(22) PCT Filed: Mar. 11, 2014

(86) PCT No.: PCT/US2014/023017
§ 371 (c)(1),
(2) Date: Aug. 5, 2015

(87) PCT Pub. No.: WO2014/150353
PCT Pub. Date: Sep. 25, 2014

(65) Prior Publication Data
US 2015/0369409 A1    Dec. 24, 2015

Related U.S. Application Data
(60) Provisional application No. 61/787,556, filed on Mar. 15, 2013.

(51) Int. Cl.
*F16L 23/02* (2006.01)
*F01D 11/00* (2006.01)
(Continued)

(52) U.S. Cl.
CPC ............ *F16L 23/02* (2013.01); *F01D 11/003* (2013.01); *F01D 11/122* (2013.01); *F01D 25/24* (2013.01);
(Continued)

(58) Field of Classification Search
CPC ...... F01D 11/003; F01D 25/24; F01D 25/246; F16L 23/0018; F16L 23/02; F16L 23/16;
(Continued)

(56) References Cited

U.S. PATENT DOCUMENTS 3,730,640 A    5/1973  Rice et al.
3,892,497 A *  7/1975  Gunderlock ............ F01D 9/042
                                                    415/134

(Continued)

FOREIGN PATENT DOCUMENTS

| GB | 2169038 A | 7/1986 |
|----|-----------|--------|
| WO | WO 199628642 A1 | 9/1996 |
| WO | 2005003518 A1 | 1/2005 |

OTHER PUBLICATIONS

The International Search Report dated Jun. 24, 2014 for International Application No. PCT/US2014/023017.
Extended European Search Report, dated Dec. 13, 2016, 6 pages.

*Primary Examiner* — Igor Kershteyn
(74) *Attorney, Agent, or Firm* — Kinney & Lange, P.A.

(57) ABSTRACT

A turbine shroud for incorporation in a turbine of a gas turbine engine has a plurality of butted shroud segments circumferentially arrayed to form a ring. Each of the shroud segments has an arcuate main shroud body portion, a radially inward extending annular flange attached to a first end of the main body portion, and a radially outward extending flange with a plurality of mounting apertures attached to a second end of the main shroud body portion. A first mount-
(Continued)

ing aperture is sized smaller than an adjacent second mounting aperture in the radially outward extending flange.

20 Claims, 6 Drawing Sheets

(51) Int. Cl.
*F01D 25/24* (2006.01)
*F16L 23/16* (2006.01)
*F16L 25/00* (2006.01)
*F01D 11/12* (2006.01)

(52) U.S. Cl.
CPC ............ *F01D 25/246* (2013.01); *F16L 23/16* (2013.01); *F16L 25/0018* (2013.01); F05D 2230/642 (2013.01); F05D 2240/11 (2013.01); F05D 2260/38 (2013.01)

(58) Field of Classification Search
CPC ........... F05D 2230/642; F05D 2240/11; F05D 2260/38
See application file for complete search history.

(56) References Cited

U.S. PATENT DOCUMENTS

| | | | |
|---|---|---|---|
| 4,247,248 A | | 1/1981 | Chaplin et al. |
| 4,565,492 A | * | 1/1986 | Bart ................... F01D 11/18 415/116 |
| 4,720,236 A | * | 1/1988 | Stevens ................ F01D 9/042 415/116 |
| 4,816,213 A | | 3/1989 | Groenendaal, Jr. |
| 4,863,345 A | | 9/1989 | Thompson et al. |
| 5,188,506 A | | 2/1993 | Creevy et al. |
| 5,188,507 A | | 2/1993 | Sweeney |
| 5,609,469 A | | 3/1997 | Worley et al. |
| 5,848,874 A | | 12/1998 | Heumann et al. |
| 6,672,833 B2 | | 1/2004 | MacLean et al. |
| 7,185,499 B2 | | 3/2007 | Chereau et al. |
| 7,334,984 B1 | | 2/2008 | Stine et al. |
| 7,866,943 B2 | * | 1/2011 | Durand ................ F01D 25/246 415/173.1 |
| 8,459,941 B2 | * | 6/2013 | Jasko .................... F01D 9/041 415/190 |
| 8,534,076 B2 | * | 9/2013 | Woodcock ............ F01D 9/023 415/138 |
| 2011/0081234 A1 | | 4/2011 | Durocher et al. |
| 2012/0107122 A1 | | 5/2012 | Albers et al. |

* cited by examiner

FIG. 6

US 10,451,204 B2

LOW LEAKAGE DUCT SEGMENT USING EXPANSION JOINT ASSEMBLY

CROSS-REFERENCE TO RELATED APPLICATION(S)

This application claims the benefit of U.S. Provisional Application No. 61/787,556 filed Mar. 15, 2013 for "Low Leakage Duck Segment Using Expansion Joint Assembly" by Mark Broomer, Russell E. Keene, Timothy M. Davis, Mark J. Rogers and claims the benefit of PCT application PCT/US2014/023017 filed Mar. 11, 2014 for "Low Leakage Duck Segment Using Expansion Joint Assembly" by Mark Broomer, Russell E. Keene, Timothy M. Davis, Mark J. Rogers.

BACKGROUND

The present disclosure relates to duct segments for a turbine engine. More particularly, the present disclosure relates to a low leakage expansion joint between the duct segment and engine case.

Pressurized air is highly valued in turbine machinery since it can be used to produce additional work on the rotor shaft. Leakage of this air is wasteful to the system and reduces the turbine efficiency. While the limiting of clearance, and thus leakage, between the rotating blade tip and out air duct segment seal is important, secondary leakage paths exist that need to be controlled. Particularly, axial, circumferential, and radial sealing all must be considered. Sealing schemes and part configurations which minimize this leakage increase the turbine overall efficiency. The prior art has included several designs to solve leaky joints between the engine case and duct segment. However, these solutions typically involve numerous components, such as separate duct segment hangers, or floating components that may not remain in the same position as the engine hardware changes in temperature.

SUMMARY

In one embodiment, a turbine shroud for incorporation in a turbine of a gas turbine engine has a plurality of butted shroud segments circumferentially arrayed to form a ring. Each of the shroud segments has an arcuate main shroud body portion, a radially inward extending annular flange attached to a first end of the main body portion, and a radially outward extending flange with a plurality of mounting apertures attached to a second end of the main shroud body portion. A first mounting aperture is sized smaller than an adjacent second mounting aperture in the radially outward extending flange.

In an alternate embodiment, a low leakage outer air duct mounting arrangement has a duct shroud segment including a radially outward extending flange with a plurality of shroud segment apertures therein, and an engine case positioned radially outward of the duct shroud segment including a plurality of case apertures that align with the corresponding plurality of shroud segment apertures. The air duct mounting arrangement also includes a plurality of collars that extend at least partially through both the case apertures and corresponding shroud segment apertures, and a plurality of fasteners that extend through the collars to secure the duct shroud segment with respect to the engine case.

In another embodiment, a turbine shroud assembly includes a shroud segment having an arcuate blade covering surface, a radially inward extending annular flange attached to a first end of the arcuate blade covering surface, and a radially outward extending flange attached to a second end of the arcuate blade covering surface that includes a plurality of apertures, wherein at least one of the plurality of apertures is sized smaller than an adjacent aperture. The shroud assembly also includes a plurality of flanged collars capable of being inserted into the plurality of apertures of the shroud segment. The smaller sized aperture locates the shroud both in an axial direction and in a radial direction, and the adjacent aperture allows the shroud segment to float in a circumferential direction.

DETAILED DESCRIPTION

In the present disclosure, a flange is used to locate the outer air duct seal. The flange assembly consists of a multiple fastener configuration with accompanying flanged collars. A single centered fastener and collar is used to locate the flange and attached structure radially and circumferentially. All fasteners together locate the structure axially. The collar allows the flange to float axially but is limited by the shoulder on the collar. When pressurized, such as from bypass air from the high pressure compressor, the structure translates aft and seals on the collar shoulders. Alternatively this can be affected by use of a gasket seal spring force between the flange and the case. The circumferentially outboard collars retain the flange axially but oversized holes in the structure (relative to the collar guide dimensions) allow the structure to expand radially and circumferentially unimpeded. This reduces the thermal stresses from affecting the joint, or impacting surrounding hardware. The collars allow the shear and bending loading from pressure loads to be carried through the collar to the case supporting structure.

The specification and drawings are accordingly to be regarded in an illustrative manner and are not intended to limit the scope of the appended claims. Efforts have been made throughout the drawings to use the same or similar reference numerals for the same or like components.

Figure 1:
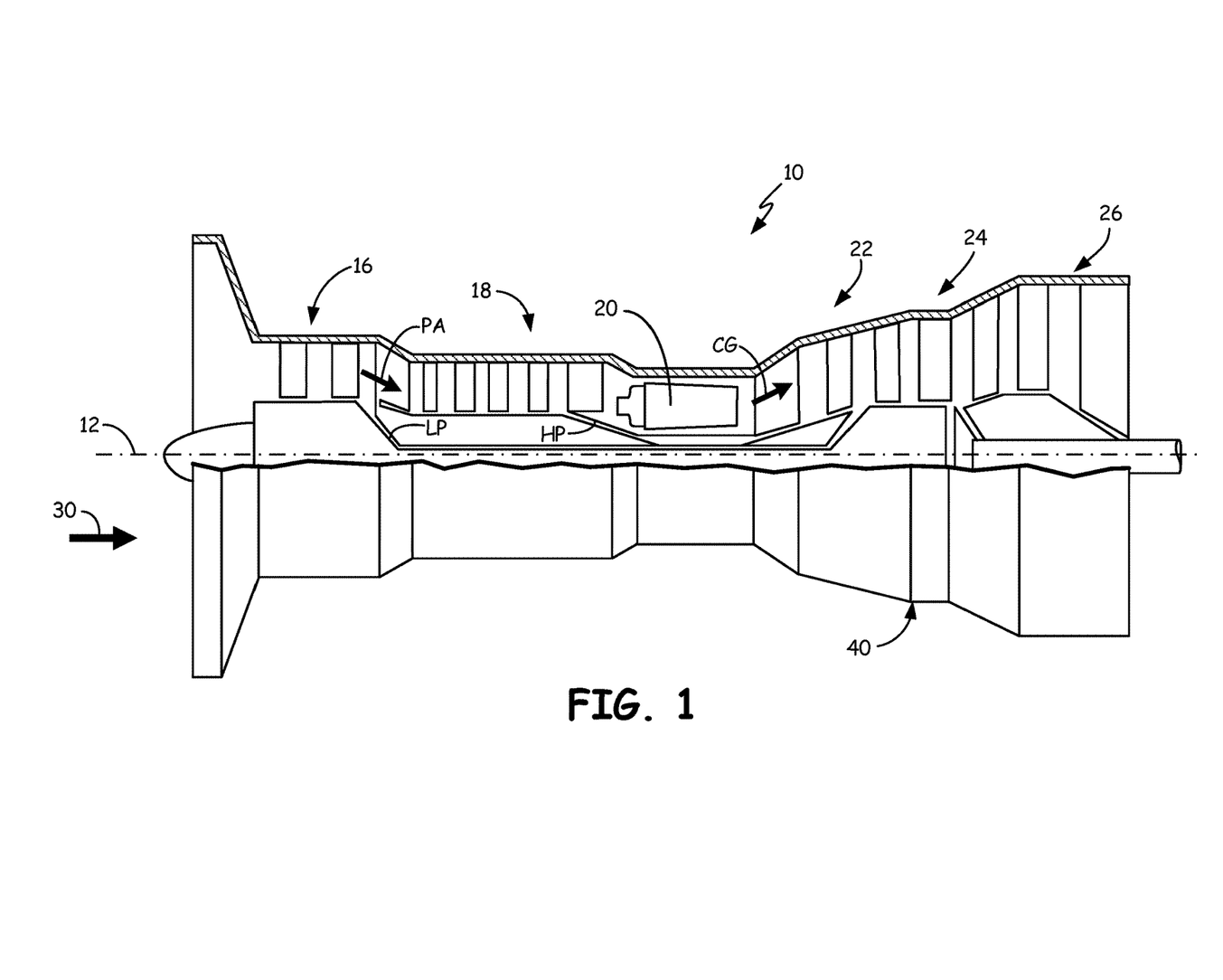
FIG. 1 is a cross-sectional view of a turbine engine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, central combustor section 20 and high and low pressure turbine sections 22 and 24. In some examples, free turbine section 26 is disposed aft of low pressure turbine 24. Although illustrated with reference to an industrial gas turbine engine, this application also extends to aero engines with a fan or gear driven fan, and engines with more or fewer sections than illustrated.

In gas turbines, incoming ambient air 30 becomes pressurized air 32 in compressors 16 and 18. Fuel mixes with pressurized air PA in combustor section 20, where it is burned to produce combustion gases CG that expand as they flow through turbine sections 22, 24 and power turbine 26. Turbine sections 22 and 24 drive high and low pressure rotor shafts HP and LP respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of industrial gas turbine engine 10. The present application is applicable to all types of gas turbine engines, including those with aerospace applications.

Figure 2:
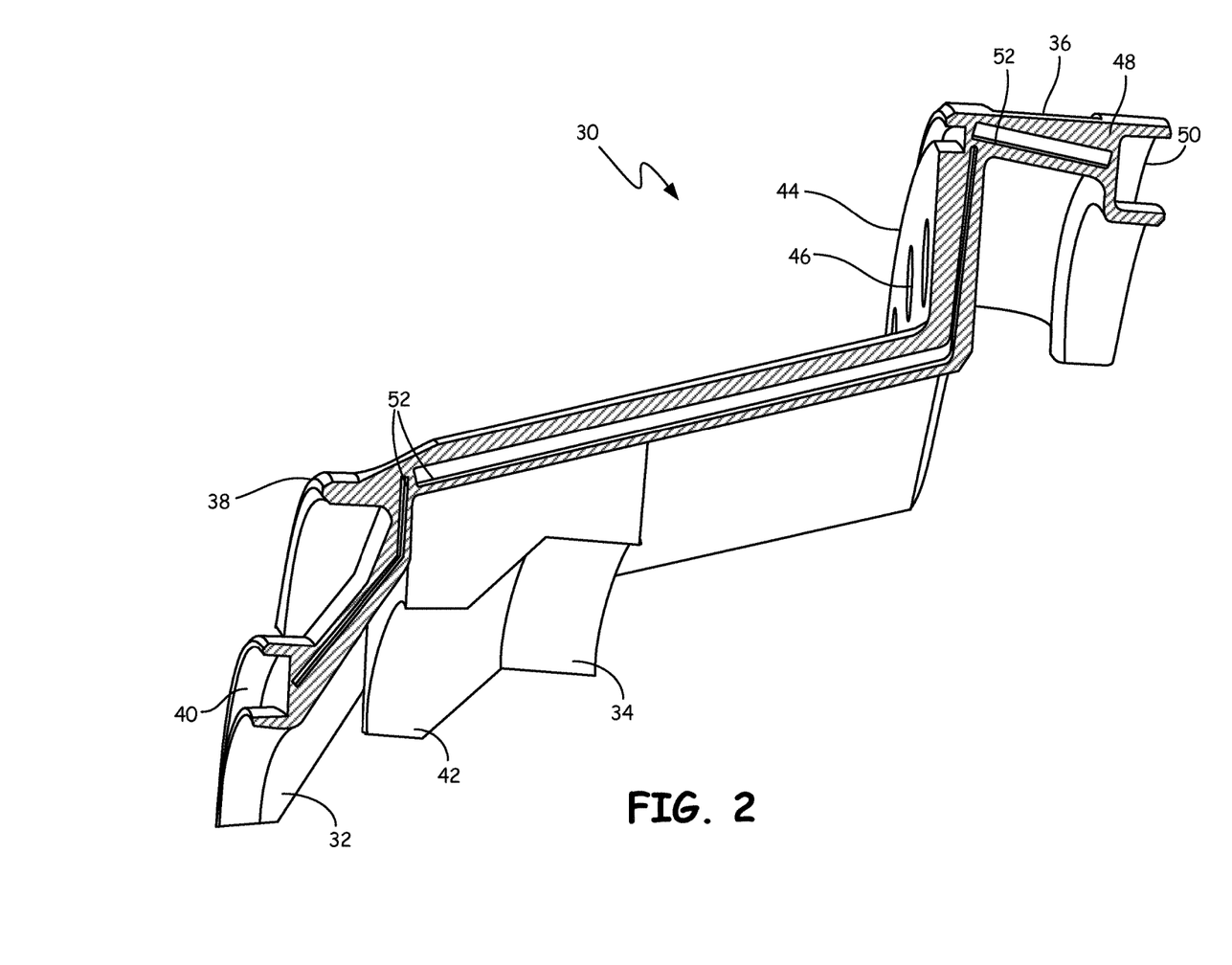
FIG. 2 is a perspective view of a duct shroud segment for the turbine engine.

FIG. 2 is a perspective view of duct shroud segment 30 for turbine engine 10. Shroud segment 30 includes first mounting flange 32, main body 34, and second mounting flange 36. First mounting flange 32 extends radially inward from main body 34, and may contain mounting hook 38 extending axially forward of main body 34 as well as seal shelf 40. Main body 34 extends axially between first mounting flange 32 and second mounting flange 34, and is arcuate and/or conical in shape about a centerline axis 12 of turbine engine 10 (see FIG. 1). The radius of arcuate main body 34 with respect to the centerline axis 12 of turbine engine 10 allows for placing adjacent shroud segments 30 side by side, resulting in an enclosed structure centered about the centerline axis 12 of turbine engine 10. A portion of main body 34 may be covered by an abradable pad 42.

Second mounting flange 36 contains radial section 44 with one or more apertures 46 therein, with axial section 48 connected to the radially outward portion thereof. Axial section 48 may also contain seal shelf 50. The circumferentially outer surfaces of shroud segment 30 contain seal slots 52 for reception of a seal (not illustrated) between adjacent shroud segments when installed in turbine engine 10. Seal slots 52 are arranged to cover both the radial and axial components of shroud segment 30. The seal member itself (not illustrated) may be a feather and/or dogbone seal common in the art.

Figure 3:
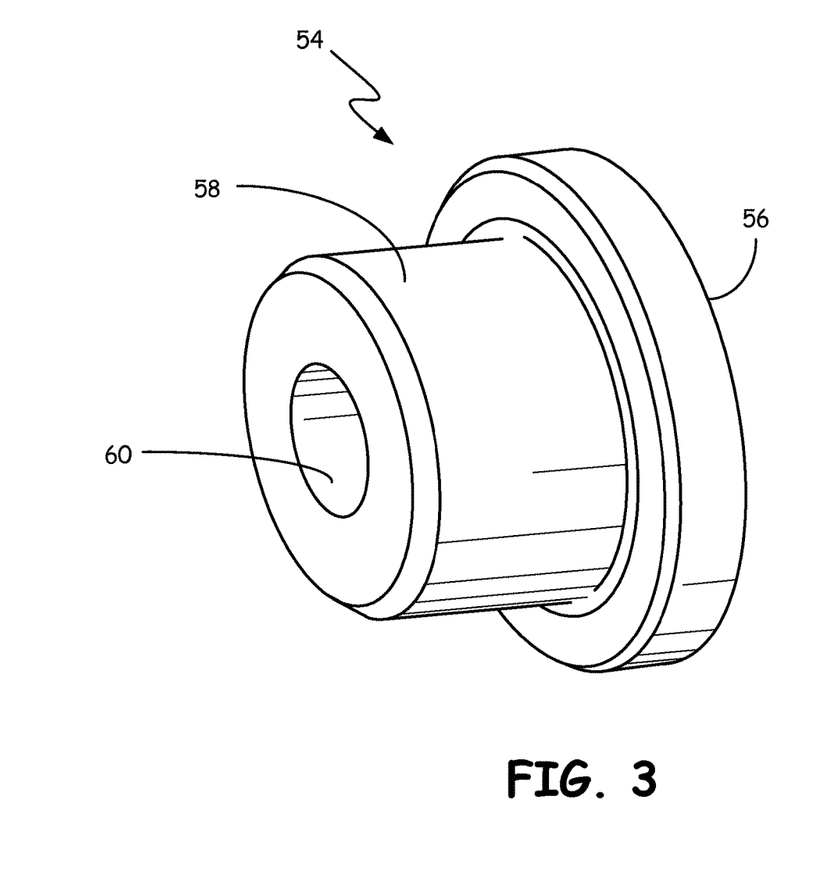
FIG. 3 is a perspective view of a collar.

FIG. 3 is a perspective view of collar 54 for insertion into one of the apertures 46 of shroud segment 30. Collar 54 contains cylindrical stem 58 with cylindrical flange 56 connected thereto, and aperture 60 that extends through the central axis of cylindrical stem 58 and flange 56 of collar 54. Collar 54 is a spacer that may be constructed from a lightweight, high temperature metal, composite, or similar rigid materials. The diameter of stem 58 is smaller than that of flange 56 to create a stepped spacer for collar 54.

Figure 4:
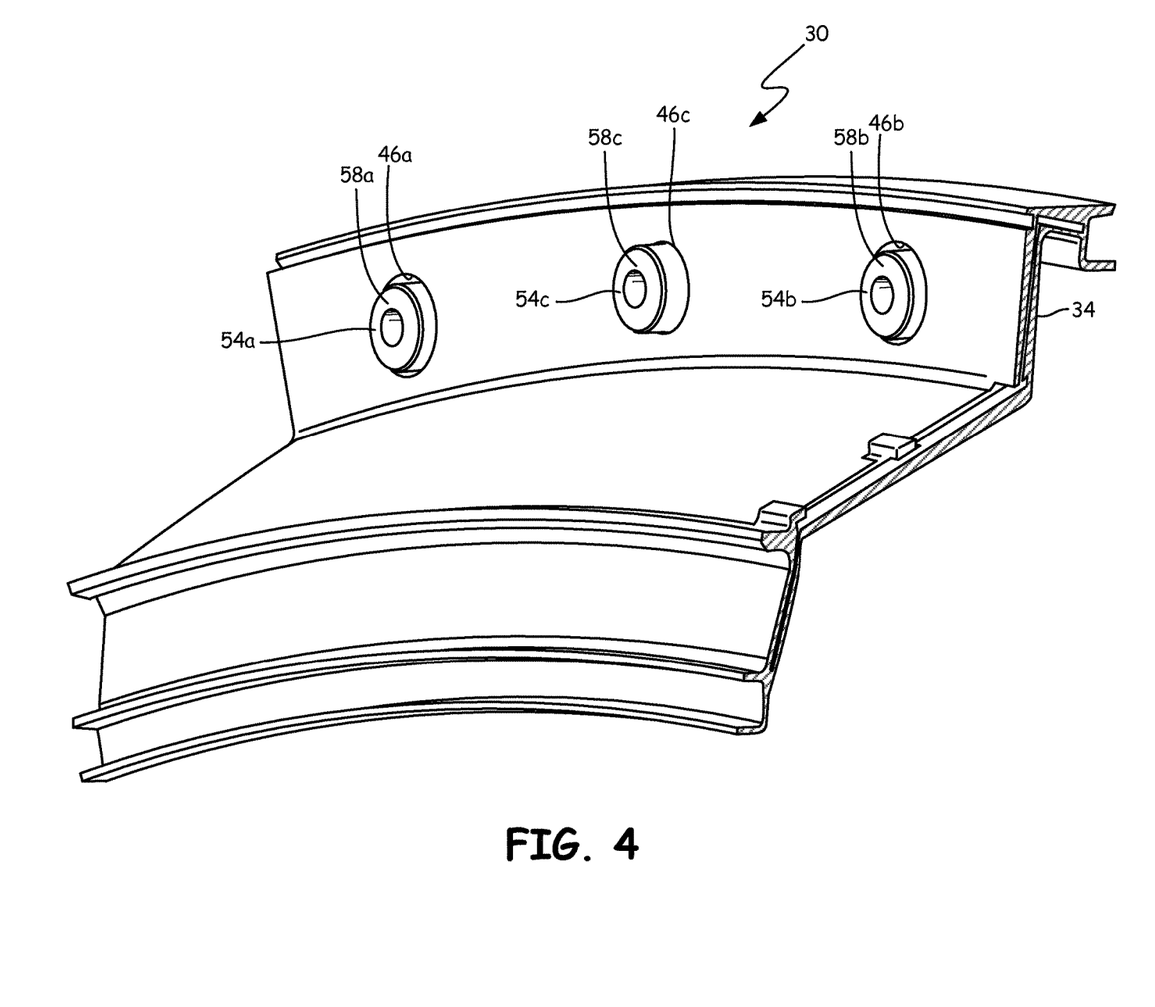
FIG. 4 is a perspective view of the duct shroud segment with collars inserted into flange openings.

FIG. 4 is a perspective view of shroud segment 30 with collars 54a, 54b, and 54c inserted into apertures 46a, 46b, and 46c of second mounting flange 34. In the embodiment illustrated, apertures 46a and 46b contain a diameter larger than the diameter of stems 58a and 58b, while the central aperture 46c is nominally sized to the same diameter of stem 58c. That is, central aperture 46c has a clearance fit while remaining apertures have nominally larger diameter. In one embodiment, all collars 54a, 54b, and 54c are of the same dimensions, while the apertures 46a and 46b are of a different diameter than aperture 46c. In an alternate embodiment, all apertures 46a, 46b, and 46c contain the same diameter, while collars 54a and 54b are of differing dimension than collar 54c. Although illustrated as cylindrical, any cross-sectional perimeter may be utilized for creating the apertures and collars, including hexagonal, octagonal, rectangular, or similar shapes.

Figure 5:
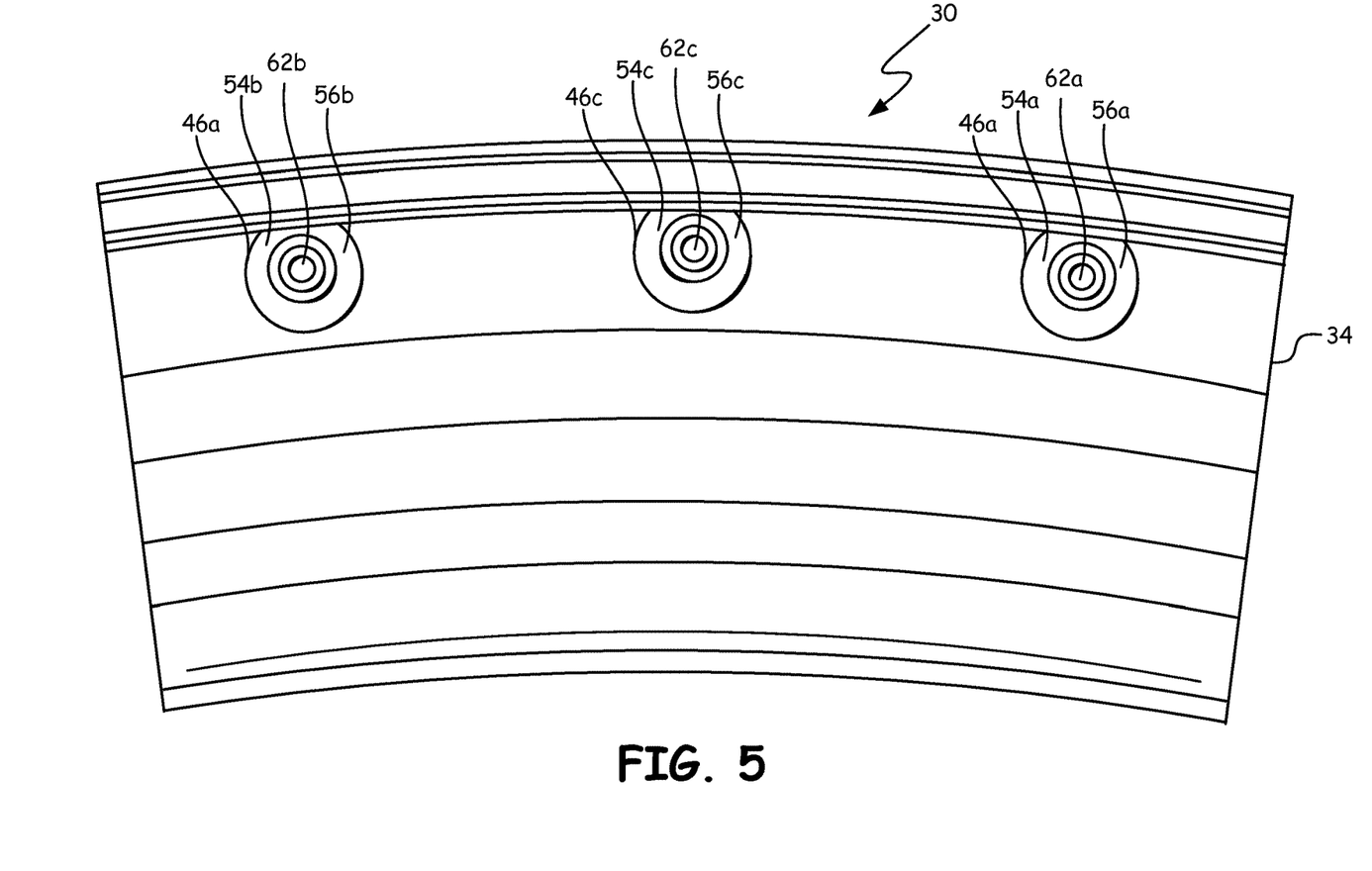
FIG. 5 is an elevation view of the aft side of the duct shroud segment with collars.

FIG. 5 is an elevation view of the aft side of shroud segment 30 with collars 54a, 54b, and 54c inserted into apertures 46a, 46b, and 46c. Apertures 46a, 46b, and 46c contain a counter-bore on the axially outer (or aft) side of second mounting flange 34 that is of a larger diameter than the respective aperture on the axially inner (or forward) side of second mounting flange 34. The counter-bore is sized to be nominally the same as the outer perimeter of flanges 56a, 56b, and 56c of collars 54a, 54b, and 54c. Fasteners 62a, 62b, and 62c are inserted through the apertures 60 in collars 54a, 54b, and 54c to secure shroud segment 30 with respect to adjacent engine components. Fasteners 62a, 62b, and 62c are common fasteners known to those of skill in the art, and may include rives, pins, bolts, machine screws, and similar structures.

Figure 6:
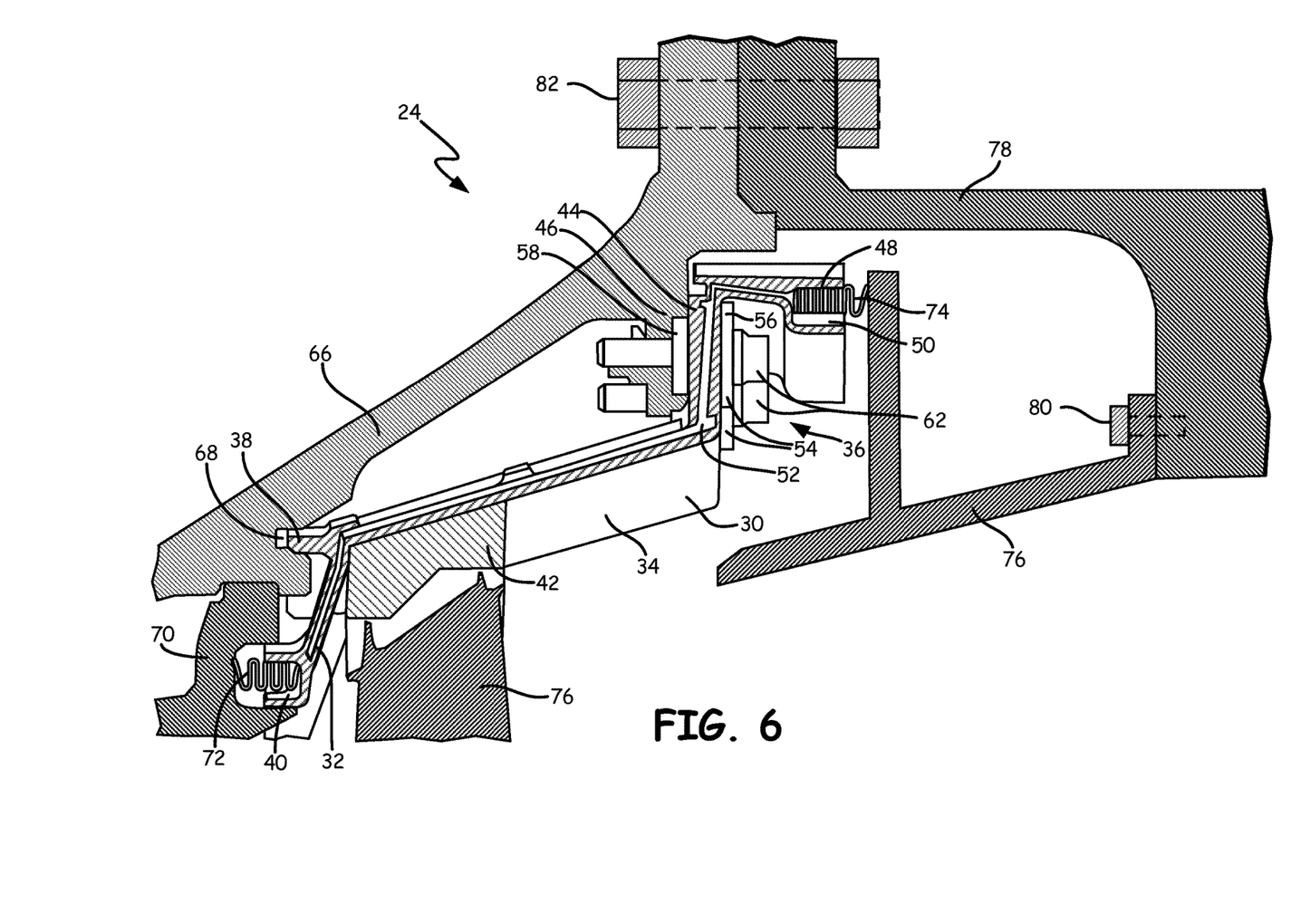
FIG. 6 is a cross-sectional view of a portion of the turbine section of the turbine engine.

FIG. 6 is a cross-sectional view of a portion of turbine section 22 or 24 of turbine engine 10. Shroud segment 30, collar 54, and fastener 62 are similar to those previously described, including all subcomponents thereof. As illustrated, shroud segment 30 is mounted to turbine case 66. Part of the attachment is through a slidable connection of the axial forward mounting hook 38 on first mounting flange 32 into groove 68, which is a circumferential channel in turbine case 66. Another part of the attachment includes fasteners 62 extending through collars 54 to secure second mounting flange 34 to turbine case 66. Turbine case 66 is part of the engine case for turbine engine 10 (see FIG. 1).

Resilient seal members 72 and 74 are contained in part by seal shelves 40 and 50, respectively, and act to prevent the escape of fluid from the gas path of turbine engine 10. Seal members 72 and 74 are contained by adjacent components, such as outer band 70 of an adjacent turbine vane, and shroud 76. Shroud 76 is attached to a portion of engine case 78 through fastener 80, and acts to create a smooth gas path for the fluid of turbine engine 10. Engine case 78 is attached to turbine case 66 through fastener 82. Abradable pad 42 further acts as a sealing component by cooperating with knife edges on turbine blade 76. Abradable pad 42 may be a honeycomb cell structure common in the art, and may cover a portion or all of the radially inner surface of main body 34 of shroud segment 30.

As illustrated, the counter-bore of apertures 46 does not extend as deep as the width (or axial depth) of flange 56 of collar 54. Further, turbine case 66 may contain a counter-bore for the reception of stem 58 of collar 54, and an aperture for fastener 62 to be inserted into. The aperture may be threaded, or in alternate embodiments, may be a through-hole configuration that allows for the securing of fastener 62 with a nut or similar structure.

The mounting structure disclosed herein locates the shroud segment within the engine with respect to the engine case, and is designed to prevent the loss of pressurized air from the gas path of turbine engine 10. That is, a low leakage duct segment assembly is disclosed that utilizes an expansion joint assembly composed of apertures, fasteners, and spacers or collars. To locate the shroud segment, a fastened flange is used. The fastened flange assembly consists of a multiple fastener 62 configuration with accompanying flanged collars 54. A single centered fastener 62/collar 56 is used to locate second mounting flange 34, and attach the shroud segment radially and axially or circumferentially. All fasteners together locate the structure axially. A single fastener (e.g., 62c) is used in conjunction with a collar (e.g., 54c) to locate second mounting flange 34 and its structure both radially and circumferentially. Collar 54c allows second mounting flange 34 to float axially, but is limited by the shoulder flange 56 on collar 54.

When pressurized, the structure of shroud segment 30 translates aft and seals on flanges 56 of collar 54. Alternatively this can be affected by use of a gasket seal spring force between flange 56 and turbine case 66. The circumferentially outboard collar(s) 54 retain second mounting flange 34 axially, but oversized holes in the structure (relative to collar stem 58 diameter) allow the structure to expand radially and circumferentially unimpeded. The thermal stresses are reduced from affecting the joint or impacting surrounding hardware and engine components. That is, larger outboard collar clearance apertures at the outer ends of the shroud segment permit expansion, or "uncurling", of the shroud segment, but retain the structure axially by the collar flange face for low leakage of pressurized air. Collars 54 allow the shear and bending forces from pressure loads to be carried through collar 54 to a supporting structure such as turbine case 66, rather than through the fasteners. Although three fasteners are illustrated, any number of fasteners may be utilized proved that the arrangement thereof allows for the circumferential expansion thereof.

This structure described herein provides lower leakage, positive location, and stress reduction for the shroud segment assembly of a gas turbine engine. Prior art designs typically utilized sheet metal assemblies to permit growth and compliance during operation. Such configurations typically leak considerably more than the integral structure disclosed and described herein. The integral structure as disclosed permits the use of feather and/or dogbone seals at the circumferential joints, and the effective use of high performance gasket seals at multiple axial locations. The fastener and collar configuration allows free expansion of a cast shroud segment structure by reducing thermal stress due to internal constraints in the structure. This greatly improves component life. Additionally, shear and bending loads on the attachment fasteners are reduced resulting in the lowered probability of premature failure of the bolts. Overall life of the component is improved, and as a result maintenance costs reduced.

Discussion of Possible Embodiments

The following are non-exclusive descriptions of possible embodiments of the present invention.

In one embodiment, turbine shroud for incorporation in a turbine of a gas turbine engine has a plurality of butted shroud segments circumferentially arrayed to form a ring. Each of the shroud segments has an arcuate main shroud body portion, a radially inward extending annular flange attached to a first end of the main body portion, and a radially outward extending flange with a plurality of mounting apertures attached to a second end of the main shroud body portion. A first mounting aperture is sized smaller than an adjacent second mounting aperture.

The turbine shroud of the preceding paragraph can optionally include, additionally and/or alternatively, any one or more of the following features, configurations and/or additional components:

wherein each pair of adjacent shroud segments have opposing abutments with axial and radial seals arranged therebetween;

wherein the radially inward extending flange contains a seal channel;

wherein the radially outward extending flange contains a seal channel;

wherein the first aperture is centrally located in the radially outward flange; and/or an abradable pad attached to a radially inner side of the main shroud body portion.

In an alternate embodiment, a low leakage outer air duct mounting arrangement has a duct shroud segment including a radially outward extending flange with a plurality of shroud segment apertures therein, and an engine case positioned radially outward of the duct shroud segment including a plurality of case apertures that align with the corresponding plurality of shroud segment apertures. The air duct mounting arrangement also includes a plurality of collars that extend at least partially through both the case apertures and corresponding shroud segment apertures, and a plurality of fasteners that extend through the collars to secure the duct shroud segment with respect to the engine case.

The low leakage outer air duct mounting arrangement of the preceding paragraph can optionally include, additionally and/or alternatively, any one or more of the following features, configurations and/or additional components:

wherein at least two of the shroud segment apertures are nominally larger than the spacers to accommodate radial expansion of the duct shroud segment;

wherein the plurality of collars contain a flange that prevents airflow in the axial direction through the nominally larger shroud segment apertures;

wherein the duct shroud segment contains three shroud segment apertures;

wherein at least one aperture is centrally located within the radially outward extending flange, and wherein the at least one aperture radially locates the duct shroud segment circumferentially with respect to the engine case;

wherein the radially outward extending flange contains a seal channel;

wherein the duct shroud segment includes a radially inward extending flange contains a seal channel;

wherein the radially inward extending flange contains an axial extension;

wherein the engine case contains a channel for reception of the axial extension; and/or wherein the duct shroud segment includes an abradable pad attached to a radially inner side thereof.

In another embodiment, a turbine shroud assembly includes a shroud segment having an arcuate blade covering surface, a radially inward extending annular flange attached to a first end of the arcuate blade covering surface, and a radially outward extending flange second end of the arcuate blade covering surface that includes a plurality of apertures, wherein at least one of the plurality of apertures is sized smaller than an adjacent aperture. The shroud assembly also includes a plurality of flanged collars capable of being inserted into the plurality of apertures of the shroud segment. The smaller sized aperture locates the shroud both in an axial direction and in a radial direction, and the adjacent aperture allows the shroud segment to float in a circumferential direction.

The turbine shroud assembly of the preceding paragraph can optionally include, additionally and/or alternatively, any one or more of the following features, configurations and/or additional components:

wherein smaller sized aperture is centrally located in the radially outward flange;

each of the plurality of flanged collars include a flange portion attached to a stem portion, and have an aperture extending through both the flange portion and stem portion;

wherein the plurality of apertures in the radially outward extending flange contain a counter-bore for reception of the flange portion of each of the plurality of flanged collars.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine shroud for incorporation in a turbine of a gas turbine engine, comprising a plurality of butted shroud segments circumferentially arrayed to form a ring, each of said shroud segments comprising:
   an arcuate main shroud body portion;
   a radially inward extending annular flange attached to a first end of the main body portion; and
   a radially outward extending flange with a plurality of mounting apertures attached to a second end of the main shroud body portion, wherein a first mounting aperture is sized smaller than an adjacent second mounting aperture.

2. The turbine shroud of claim 1 wherein each pair of adjacent shroud segments have opposing abutments with axial and radial seals arranged therebetween.

3. The turbine shroud of claim 1 wherein the radially inward extending flange contains a seal channel.

4. The turbine shroud of claim 1 wherein the radially outward extending flange contains a seal channel.

5. The turbine shroud of claim 1 wherein the first aperture is centrally located in the radially outward flange.

6. The turbine shroud of claim 1 further comprising:
   an abradable pad attached to a radially inner side of the main shroud body portion.

7. A low leakage outer air duct mounting arrangement comprising:
   a duct shroud segment including a radially outward extending flange with a plurality of shroud segment apertures therein;
   an engine case positioned radially outward of the duct shroud segment including a plurality of case apertures that align with the corresponding plurality of shroud segment apertures;
   a plurality of collars that extend at least partially through both the case apertures and corresponding shroud segment apertures; and
   a plurality of fasteners that extend through the collars to secure the duct shroud segment with respect to the engine case.

8. The mounting arrangement of claim 7 wherein each of the plurality of collars includes a stem that extends at least partially through both one of the case apertures and the corresponding one of the shroud segment apertures, and wherein at least two of the shroud segment apertures are nominally larger than spacers to accommodate radial expansion of the duct shroud segment.

9. The mounting arrangement of claim 8 wherein the plurality of collars contain a flange that prevents airflow in the axial direction through the nominally larger shroud segment apertures.

10. The mounting arrangement of claim 8 wherein the duct shroud segment contains three shroud segment apertures.

11. The mounting arrangement of claim 10 wherein at least one aperture is centrally located within the radially outward extending flange, and wherein the at least one aperture radially locates the duct shroud segment with respect to the engine case.

12. The mounting arrangement of claim 7 wherein the radially outward extending flange contains a seal channel.

13. The mounting arrangement of claim 7 wherein the duct shroud segment includes a radially inward extending flange that contains a seal channel.

14. The mounting arrangement of claim 13 wherein the radially inward extending flange contains an axial extension.

15. The mounting arrangement of claim 14 where in the engine case contains a channel for reception of the axial extension.

16. The mounting arrangement of claim 7 wherein the duct shroud segment includes an abradable pad attached to a radially inner side thereof.

17. A turbine shroud assembly comprising:
   a shroud segment including:
      an arcuate blade covering surface;
      a radially inward extending annular flange attached to a first end of the arcuate blade covering surface; and
      a radially outward extending flange, attached to a second end of the arcuate blade covering surface, that includes a plurality of apertures, wherein at least one of the plurality of apertures is sized smaller than an adjacent aperture; and
   a plurality of flanged collars capable of being inserted into the plurality of apertures of the shroud segment;
   wherein the smaller sized aperture locates the shroud segment both in an axial direction and in a radial direction; and
   wherein the adjacent aperture allows the shroud segment to float in a circumferential direction.

18. The turbine shroud assembly of claim 17 wherein smaller sized aperture is centrally located in the radially outward flange.

19. The turbine shroud assembly of claim 17 wherein each of the plurality of flanged collars include a flange portion attached to a stem portion, and have an aperture extending through both the flange portion and stem portion.

20. The turbine shroud assembly of claim 19 wherein the plurality of apertures in the radially outward extending flange contain a counter-bore for reception of the flange portion of each of the plurality of flanged collars.

* * * * *